United States Patent [19]
Liu

[11] Patent Number: 5,317,716
[45] Date of Patent: May 31, 1994

[54] MULTIPLE CACHES USING STATE INFORMATION INDICATING IF CACHE LINE WAS PREVIOUSLY MODIFIED AND TYPE OF ACCESS RIGHTS GRANTED TO ASSIGN ACCESS RIGHTS TO CACHE LINE

[75] Inventor: Lishing Liu, Pleasantville, N.Y.

[73] Assignee: International Business Machines Corporation, Armonk, N.Y.

[21] Appl. No.: 932,457

[22] Filed: Aug. 20, 1992

Related U.S. Application Data

[63] Continuation of Ser. No. 689,121, Apr. 22, 1991, abandoned, which is a continuation of Ser. No. 232,722, Aug. 16, 1988, abandoned.

[51] Int. Cl.5 .................. G06F 12/14; G06F 12/16
[52] U.S. Cl. .................. 395/425; 364/243.44; 364/246.8; 364/255.8; 364/DIG. 1
[58] Field of Search ................ 395/400, 425

[56] References Cited

U.S. PATENT DOCUMENTS

| | | | |
|---|---|---|---|
| 3,735,360 | 5/1973 | Anderson et al. | 395/250 |
| 3,771,137 | 11/1973 | Barner et al. | 395/425 |
| 4,181,937 | 1/1980 | Hattori et al. | 395/250 |
| 4,394,731 | 7/1983 | Flusche et al. | 395/425 |
| 4,400,770 | 8/1983 | Chan et al. | 395/400 |
| 4,445,174 | 4/1984 | Fletcher | 395/425 |
| 4,463,420 | 7/1984 | Fletcher | 395/425 |
| 4,464,712 | 8/1984 | Fletcher | 395/425 |
| 4,484,267 | 11/1984 | Fletcher | 395/425 |
| 4,503,497 | 3/1985 | Krygowski et al. | 395/425 |
| 4,513,367 | 4/1985 | Chan et al. | 395/425 |
| 4,622,631 | 11/1986 | Frank et al. | 395/800 |
| 4,658,356 | 4/1987 | Shiozaki et al. | 395/425 |
| 4,719,568 | 1/1988 | Carrubba et al. | 395/425 |
| 4,775,955 | 10/1988 | Liu | 395/425 |
| 4,797,814 | 1/1989 | Brenza | 395/425 |

Primary Examiner—Thomas C. Lee
Assistant Examiner—Larry J. Ellcessor
Attorney, Agent, or Firm—Ronald L. Drumheller; Richard M. Ludwin

[57] ABSTRACT

A method for increasing cache concurrency in a multiprocessor system. In a multiprocessor system having a plurality of processors each having a local cache in order to increase concurrency the directory entry for a line in local cache will be assigned an LCH bit for locally changed status. If the last cache to hold the line had made a change to it this bit will be set on. If not, the bit will be off and thereby allow the receiving or requesting cache to make change to the line without requiring a main storage castout.

8 Claims, 5 Drawing Sheets

MULTIPLE CACHES USING STATE INFORMATION INDICATING IF CACHE LINE WAS PREVIOUSLY MODIFIED AND TYPE OF ACCESS RIGHTS GRANTED TO ASSIGN ACCESS RIGHTS TO CACHE LINE

This application is a continuation of application Ser. No. 689,121 filed on Apr. 22, 1991, now abandoned, which is a continuation of application Ser. No. 232,722 filed on Aug. 16, 1988, now abandoned.

BACKGROUND OF THE INVENTION

1. Field of the Invention

The invention relates generally to caches in a multiprocessor system and more particularly to the use of an additional change bit in a cache directory to indicate whether a changed line in the cache was changed by that cache or another.

2. Description of the Prior Art

Modern high performance stored program digital computers conventionally fetch instructions and data from main memory and store the fetched instructions and data in a cache memory. A cache is a local memory that is typically much smaller and much faster than the main memory of the computer. Virtually all high performance digital computers use a cache and even some commercially available microprocessors have local caches.

Caches have been developed because it has not been possible to build extremely large memories at a reasonable cost that operate having an access time commensurate with modern day pipelined processors. It is however possible to build inexpensive, small memories that can keep up with the processor. Since an instruction in the cache can be immediately accessed by the processor, caches have been used to speed up computer performance.

It has been observed that items (either instruction or data) once referred tend to be referred to again in the near future. This property is known as the "Temporal Locality of Reference" and it is a rationale for keeping the most recently referenced items in the cache. It has also been observed that if an item is referenced, then other items that are physically close to the reference item are also likely to be referenced. This second property is known as "Spatial Locality of Reference" and it is a rationale for keeping cache lines that are blocks of continuous items.

Caches can be used in both multiprocessor and uniprocessor systems. In the type of multiprocessor (MP) system known as the tightly coupled multiprocessor system in which several processors (CP) have their own caches that share a common operating system and memory, there are additional problems since it is necessary for each cache to know what has happened to lines which may be in several caches simultaneously. In a multiprocessor system where there are many CPs sharing the same main storage, each CP is required to obtain the most recently updated version of data according to architecture specifications when access is issued. This requirement necessitates constant monitoring of possible data consistencies among caches, often known as the cache coherence problem.

There are various types of caches in prior art multiprocessor systems. One type of cache is the store through (ST) cache which does not interfere with the CP storing data directly to the main storage (or second level cache) in order to always update changes of data to main storage. Upon the update of a store through to main storage appropriate cross interrogate (XI) actions may take place to invalidate the copies of a cache line located in caches other than the one at the CP that initiated the store. Usually store through cache designs require substantial main storage bandwidths to incorporate the data stores.

Another type of cache design is the store-in cache (SIC). SICs are described in U.S. Pat. Nos. 3,735, 360 to Anderson et al. and 3,771,137 to Warner et al A SIC cache directory is described in detail in U.S. Pat. No. 4,394,731 to Flusche et al. in which each line in a store-in cache has its multiprocessor shareability controlled by an exclusive/read only (EX/RO) flag bit. The main difference between ST and SIC caches is that, all stores in SIC are directed to the cache itself (which may cause a cache miss if the stored line is not in the SIC cache). In a store-in cache design data transfers upon a misfetch can take place through a cache to cache transfer bus (CTC) if a copy is in the remote cache. A storage control element is used which contains copies of the directories in each cache. This permits cross interrogate (XI) decisions to be resolved fairly efficiently. Usually cache line modifications are updated to main storage only when the lines are replaced from the cache.

Lines in a cache are typically replaced in accordance with a replacement algorithm which usually ages out a least recently used line. In a store-in cache design, when such a modified/changed cache line ages out it is also written to memory. As a result in the store-in cache design main storage bandwidth is reduced at the expense of more complex coherence control and the penalties arising from cross interrogate castouts. Cross interrogate castouts occur when a data access from one CP finds a line modified in the cache of another CP.

The cache directory contains information as to whether the line is read only (RO), exclusive (EX), changed (CH) or invalid (INV).

A cache line that is RO is valid only in a read only state. The processor can only fetch from the line. Stores into the line are prohibited. The cache line may be shared simultaneously among different caches.

A cache line that is EX is valid but only appears in the cache of one processor. It is not resident in any other (remote) cache. The one (owning) processor is allowed to store into the line. A cache line that is CH indicates that not only is the line valid and EX but that it has been stored into. That is the copy in main storage may not be up to date. When a CH line is replaced a copy is sent to main storage via a castout action.

An INV cache line is a line that is invalid.

In a typical computer system a first CP, $P_1$, may request an instruction or data from a line in a cache. Its own cache will be checked and if the particular line requested is read only (RO) it may make a store request, and via the storage control element (SCE), make that line exclusive (EX). Once the line is made exclusive, the storage control element (SCE) will indicate to the other caches that the line is invalid and the first cache will be free to write into that line. Once that line has been written, a CH-bit, indicating that the line has been changed, is set. Thereafter, if a second processor $P_2$ requests that line the change bit remains set and even if $P_2$ does not store into that line the change bit remains set. This occurs because the cache-to-cache bus is used to transfer the line. The reason the CH-bit stays on is that the line never goes through the main storage (i.e. the CH-bit on indicates that the storage is not up to date). As long as the change bit remains set, however, the line must be exclusive to only one cache at any time.

With the above approach concurrency may be lost unnecessarily since a line which could be shared by fetches from different CPUs simultaneously may now be forced to reside in a single cache most of the time. For instance, consider a line L that is more frequently accessed and is modified only relatively occasionally during certain time intervals. Once L is modified by a processor it will mostly stay CH among different caches until it is actually replaced from a cache through LRU replacement. Every time a processor issues a data fetch on line L. a cross interrogate (XI) will be necessary, if L is in a remote cache.

The above anomaly results due to the fact that the CH bit in a directory entry cannot tell whether such a changed line is no longer likely to be modified soon. Such problems often occur, for example, at power on when initial changes are made to the cache, and thereafter all that is usually required is read only (RO) status for the line. The change bit will not be reset until the line ages out and is dumped to main memory.

As caches grow larger and the number of CPU's in a multiprocessor system increase, this problem becomes even greater. With bigger caches lines do not age out as quickly, and as the number of CPU's increases a line tends to be passed around among the CPU's more before getting the chance to age out.

There are a variety of cache management techniques known in the art. There is however no known art which is directed to minimizing the loss of cache concurrency due to limitations of the use of the change bit. The following is representative art in cache control mechanisms.

U.S. Pat. No. 4,464,712 to Fletcher deals with certain strategies of level 2 cache replacements in a two level cache hierarchy (L1/L2). The L1 are the processors private (local) cache and the L2 is shared by all processors at a second level. An R bit and a L2 block entry are used as indicators of whether the block should be subject to replacement priority. Fletcher proposes some methods for manipulating the R bits on DLAT hits/misses. The present invention is independent of the second level cache (L2) hierarchy and is only concerned about the concurrency of data lines in a first level processor local caches.

In U.S. Pat. No. 4,445,174 to Fletcher a performance benefit is claimed on the basis of using a common cache and reducing sharing overhead. The common cache is not used as a second level but rather as a first level cache on top of the processor's private caches. Fletcher '174 proposes deciding whether a line should be moved to the shared cache primarily based upon whether XI is observed and access to the line finds it is CH'd in another processor's private cache. Damaging sharing is detected via a remote CH conditions and the line is then put into a shared cache which is assumed to be fast for all processors. Concurrency in the present invention is achieved by allowing a line in different caches in a read only state when a damaging sharing characteristic disappears.

In U.S. pat. No. 4,181,937 to Hattori et al. an Mp cache replacement scheme in a two level cache hierarchy is taught. Upon the decision of replacement of a block from L2 shared by all processors, blocks with fewer numbers of copies in the first level processor caches are given higher preference. This is supposed to increase concurrency at L1 with better L2 replacement strategies. The present invention is not concerned with L2 replacements.

In U.S. Pat. No. 4,503,497 to Krygowski et al. a cache to cache transfer multiprocessor design is discussed wherein when a CH'd line is accessed by a remote processor, the line is transferred over as CH'd and exclusive copy without accessing main storage. The present invention improves on this design and requires an alteration to the CH bit.

In U.S. Pat. No. 4,394,731 to Flusche et al. in cross interrogate situations (that is a line is remotely EX or CH'd ) the line is fetched as EX (not CH) only when it is found CH'd in the remote cache. The cache to cache transfer environment is not discussed in Flusche et al. The present invention provides a capability to do this kind of EX (but also CH) fetch upon remote CH situations for a cache to cache transfer environment. This has several advantages since when using a cache to cache transfer facility the CH line may be transferred to another cache as EX and CH'directly so that main storage update (castout) traffic is eliminated. Further in this system the condition of the CH line cannot be determined (that is whether the changes due to recent stores or whether the changes was pingponged back and forth with unnecessary loss of concurrency).

Accordingly it is an object of the invention to provide a cache coherency mechanism that accounts for how recently a cache line was changed.

It is another object of the invention to avoid unnecessary restriction on concurrency of a cache line due to its being modified as a remote past event.

It is still another object of the invention to allow cache lines to be read only and be available to all processors if it has not been changed recently.

These and other objects, advantages and features of the invention will be more apparent upon reference to the specification and drawings.

SUMMARY OF THE INVENTION

Figure 1:
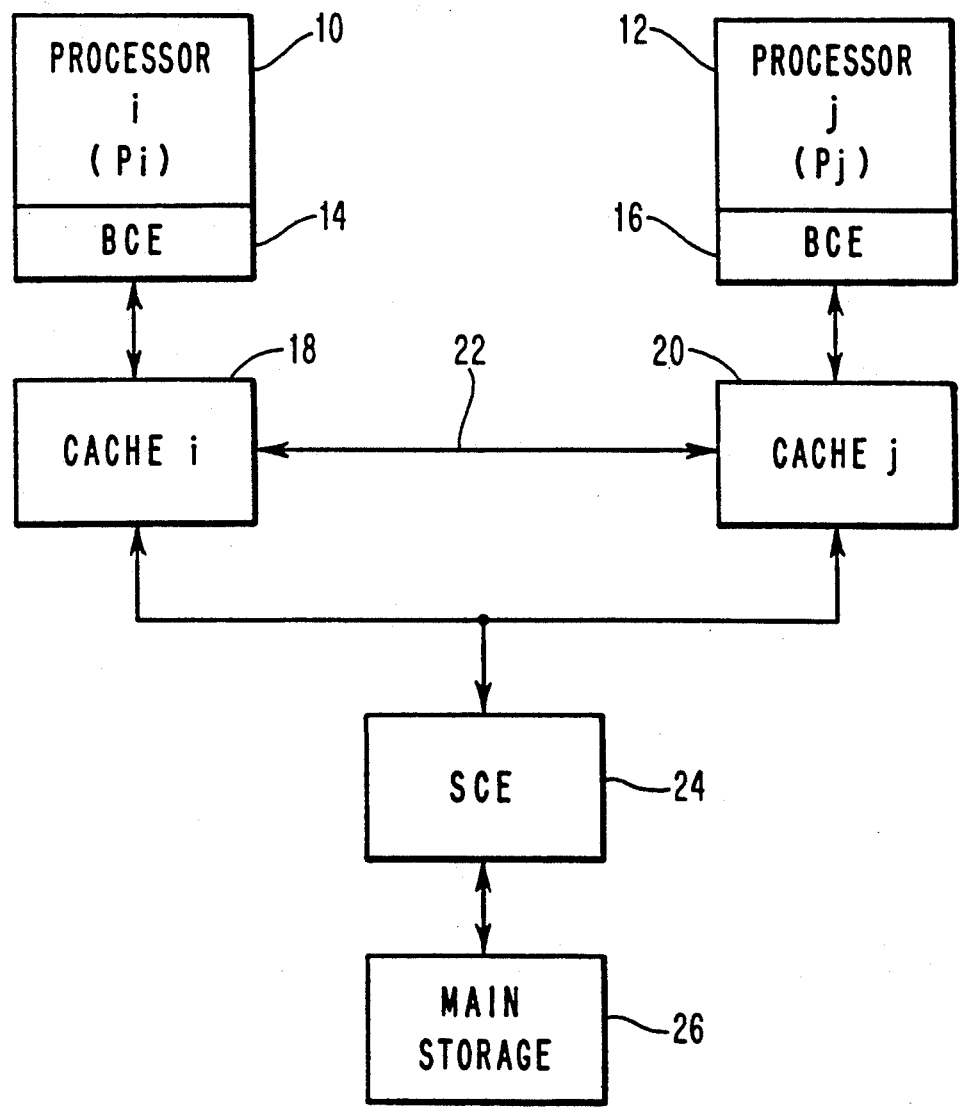
FIG. 1 is block diagram of a multiprocessor system using the present invention.

The subject invention describes a cache coherence mechanism in which the CH state is divided into two substates, namely $CH_{loc}$ and $CH_{rem}$. The $CH_{loc}$ state means that the cache has been recently stored into by the local processor. The $CH_{rem}$ state means that the line contains only modified data, that is data that was received from another cache and changed by that cache and inherited upon the last fetch. The present invention uses a $CH_{loc}$ status bit to determine whether line L should be kept read only (RO) in both caches in the above example.

DETAILED DESCRIPTION OF THE PREFERRED EMBODIMENTS

In multiprocessor mainframe computers such as the IBM Corporation 3090 series, store-in caches are used. For each processor $P_i$ there is a store-in cache $C_i$.

A directory is associated with each cache and each entry in the directory can have one of three possible states:

INV—this indicates that the cache entry is invalid.

RO—this indicates that the cache entry is valid in a read only state. The processor can only fetch from the line and stores into the line are prohibited.

EX—this indicates that the line is valid and is not resident in any other cache other than the one it appears in (i.e. it is exclusive). The other caches are considered remote caches. The processor owning the cache which in turn owns the line will be allowed to store into the line, but not the non-owning processors.

There is also a CH bit (changed bit) associated with each cache directory entry. For a valid line in a cache, the CH bit is on only if the entry is in the EX state. When the CH bit is on it is said that the line is in the CH state. CH indicates that not only is the line valid and exclusive but also has been stored into. That is the copy of the line at the shared main memory (main storage or MS) may not reflect the most recent changes made by one of the processors. When the line is replaced, the modifications to the line are sent to main memory via a mechanism known as a castout action.

Multiple processors in the system are connected to a common storage control element (SCE). There is also a buffer control element (BCE) for each processor that maintains a directory for that processor's cache. All major memory accesses from a processor will be to its cache. Upon a cache miss (i.e. when the line is not found in the cache) the buffer control element makes a request to the storage control element to obtain a copy of the line and get the proper state (RO or EX) for the line. When a store from a processor does not find the line in the EX or CH state at its cache, the buffer control element needs to send a request for an exclusive state to the storage control element. When a processor stores into a valid (EX) line in the cache, that line is set to the CH state.

Upon receiving a request from a processor, storage control element 24 determines the actions needed to grant the proper authorizations in order to maintain architectural consistency. In a computing system such as the aforementioned IBM 3090, storage control element 24 maintains copies of directories for processor caches. Storage control element 24 can then determine whether there are copies of the line in another cache and what caches they are in and further is able to determine whether that line is in an RO or EX state. When a line is indicated as EX for a processor at the storage control element, the line may or may not be in the CH state in the cache at a particular moment.

In the IBM 3090 system there is a CTC bus (22). Cache lines are thus transferred between different caches via CTC bus 22 without directly going through main memory. There are three major types of memory access from prior units, namely I-Fetch (instruction fetch), D-Fetch (Data or Operand Fetch) and D-Store (Data or Operand Store). I-Fetch and D-Fetch accesses read data. D-stores modify memory contents. In certain situations, (for example, for an interlock instruction) a D-fetch may require an exclusive (EX) state.

The operations for an access to cache are as follows. First, when a processor accesses a line L in its cache with proper authorization the access is granted without extra actions. A line having an EX state can be accessed by any of the three request types, that is I-Fetch, D-Fetch or D-Store. A D-Store, however, requires an EX state with a CH bit turned on after the store.

When the processor $P_i$ requests a line L through an instruction fetch and when the line L is EX at a remote processor $P_j$, the storage control element will signal to $P_j$ to release its EX status. Upon receiving the signal the buffer control element of $P_j$ will transfer the line to $P_i$ via the cache to cache bus. The buffer control element 16 of $P_j$ causes a castout of the line to main storage 26. At the end both caches 18 and 20 respectively, of processors i (10) and processor j (12) will have line L with a read only (RO state).

When processor $P_i$ (10) requests a line L through a data fetch (D-Fetch or Operand Fetch) and when L is exclusive at remote processor $P_j$, storage control element 24 signals $P_j$ to release its EX status for line L. Upon receiving the signal, the buffer control element of $P_j$ causes a cache to cache transfer over bus 22 of the line L to $P_i$ as above. In case a line L is not changed at cache j (20) both cache i (18) and cache j (20) will obtain line L with a read only state as above (for the I-Fetch). If, however, L happens to be CH (changed) at cache j, processor i (10) will receive the line with a CH state (EX with a CH bit turned on) and the buffer control element 16 of processor j (12) will invalidate L from its own cache. The last situation is called the Conditional D-Fetch CH upon remote CH-hit.

When processor i has a miss on line L via an I-Fetch or D-Fetch, and when storage control element 24 finds the line not EX at any remote cache (for example, processor j) storage control element 24 may schedule the line transfer from a remote cache if found resident there or schedule the line fetch from main storage (26) depending on implementation. At the end processor i (10) will obtain line L in a read only state except when storage control element 24 finds that L is not in any of the caches for a D-Fetch miss. When a D-Fetch missed line is not in any of the caches, a mainframe computer such as the IBM 3090 grants $P_i$ an exclusive state to the newly fetched line from main storage 26.

When processor i requests exclusive status on a line that is read only in its own cache then the storage control element 24 must determine whether that line L is resident in other remote caches, for example, cache 2 (20) belonging to processor j (12). If line L is found, storage control element signals those remote caches (cache 2) to invalidate their copies. Storage control element 24 then grants an EX state on line L to processor i (10) when it makes sure that all the remote copies have been invalidated.

When processor i (10) requests an exclusive status on line L that is not resident in its cache, storage control element 24 determines whether the line is EX in remote caches (for example, processor j (12)). If not, the line is fetched to processor i (10) from a remote cache or from main storage 26 and all possible remote copies of L are signaled to be invalidated. Otherwise, the line is fetched to processor i (10) from the remote cache 20 with an exclusive state, which requires invalidation of the line from the remote cache. In the latter situation the line transferred to processor i (10) will also be in the CH state if it happens to be CH at the remote cache.

Figure 2:
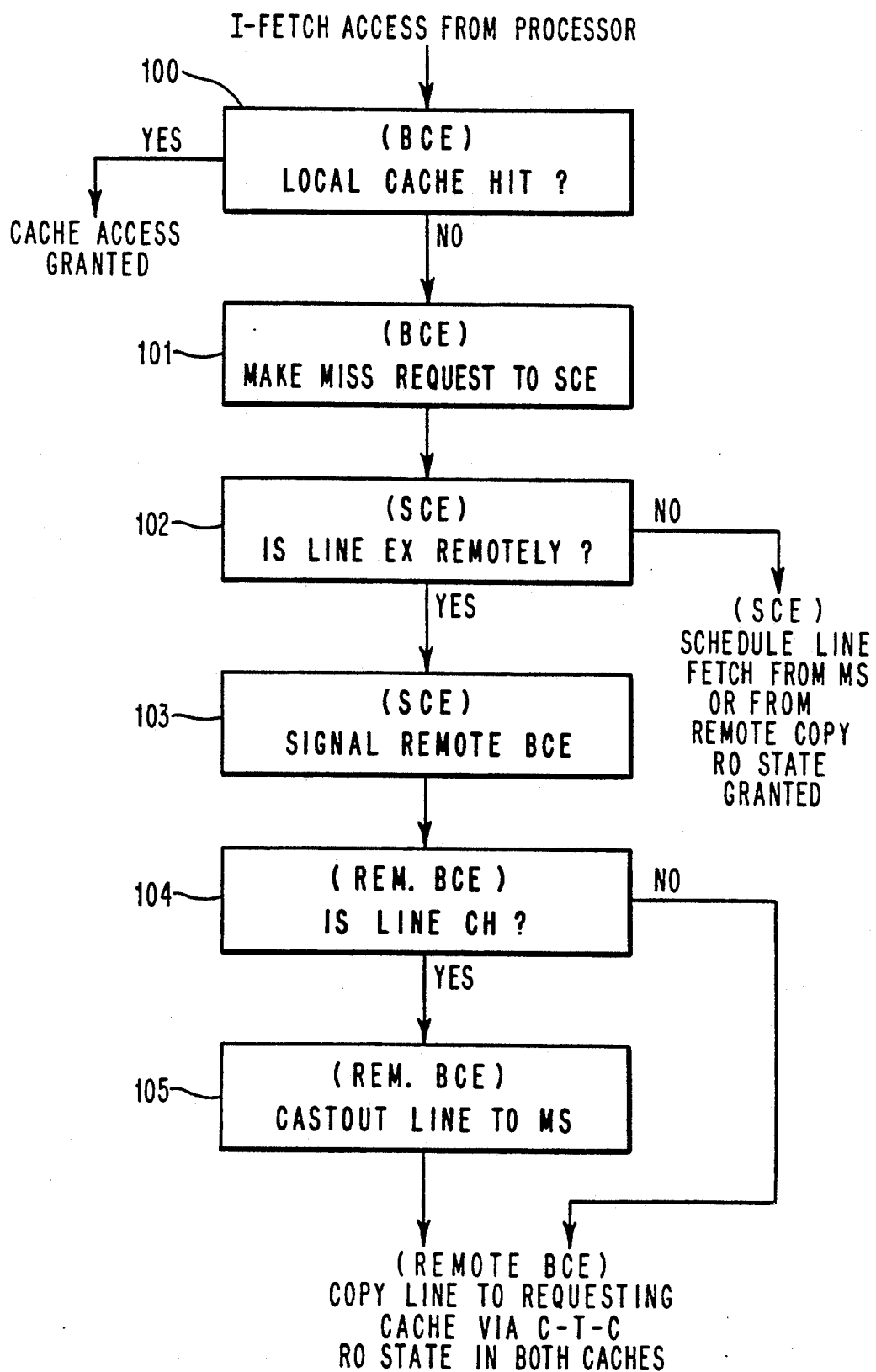
FIGS. 2, 3 and 4 are flow-charts describing prior art cache operation.
Figure 3:
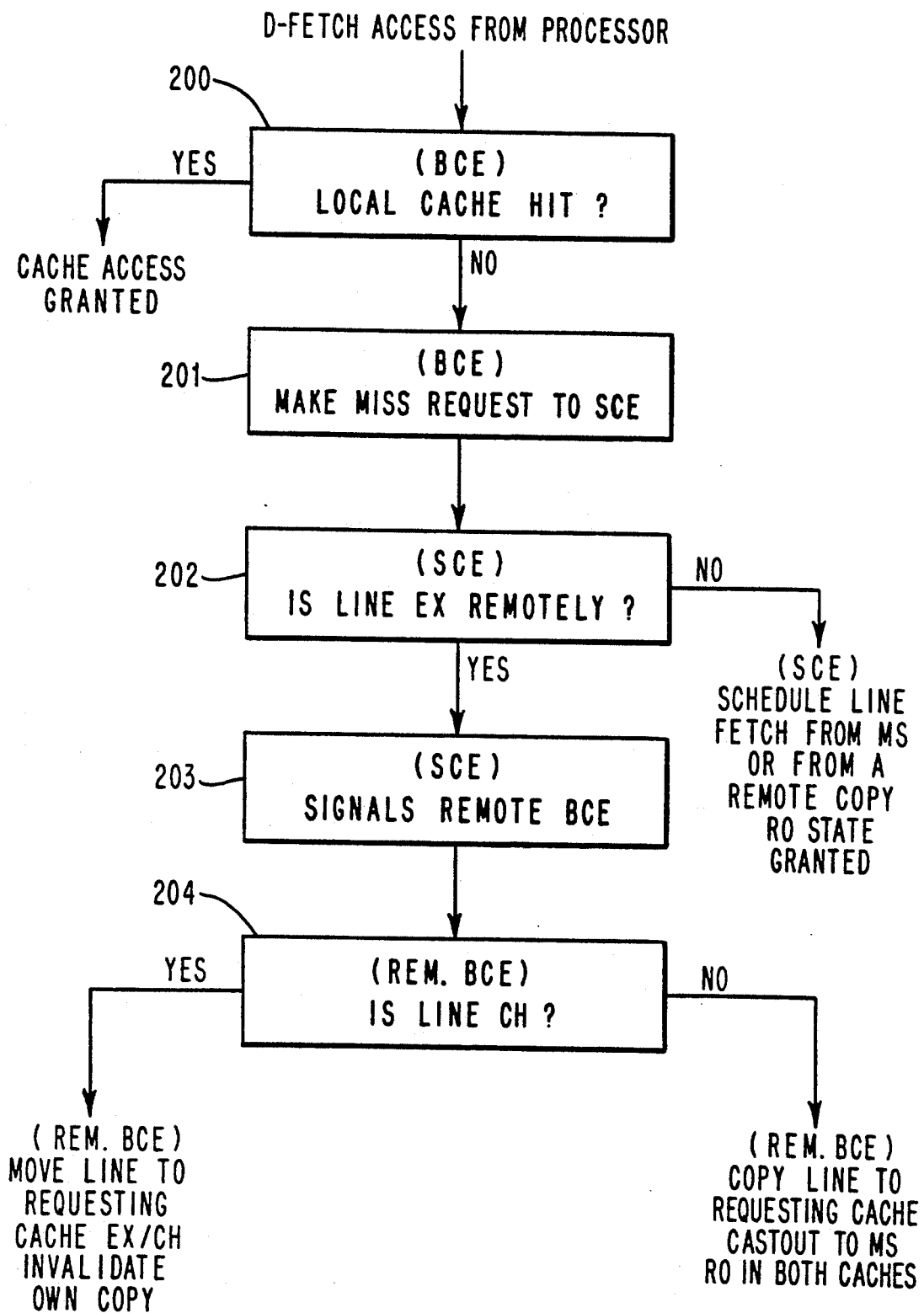

The foregoing operations are illustrated in FIGS. 1-3. In FIG. 2 an instruction fetch access from the processor is shown. At Step 100 local buffer control element 14 tests to see if the line being accessed by the processor is in the cache. If yes, cache access is granted, if not, the buffer control element at Step 101 makes a miss request to the storage control element 24. At Step 102 storage control element 24 determines if the line is exclusively remote. If it is not, storage control element 24 schedules a line fetch from main storage or from the remote copy and read only status is granted. If it is exclusively held remotely, storage control element 24 signals the remote buffer control element at Step 103. At Step 104 the remote buffer control element determines if the line has been changed or (is CH). If not, remote buffer control element 16 copies the line to the requesting cache via a cache to cache transfer (over CTC bus 22) and assigns the line to be read only (RO) in both caches. If, however, the line is changed, the remote branch control element casts out the line to main storage.

FIG. 3 is a flow-chart of a data fetch access from the processor. At Step 200 buffer control element 14 determines if the line being requested by the processor is locally contained in local cache 18. If it is, cache access is granted. If it is not, however, buffer control element then will make a miss request to storage control element 24 at Step 201. At Step 202 it is determined if the line is exclusive remotely. If it is not, storage control element 24 schedules a line fetch from main storage or from a remote copy in another cache and read only status is granted. If, however, the line is exclusive remotely, storage control element 24 signals remote buffer control element 16 at Step 203 and at Step 204 remote buffer control element 16 determines if the line has been changed. If it has not been changed, remote buffer control element 16 copies a line to the requesting cache (18), casts out the line to main storage and assigns read only status in both caches (18 and 20) to that line. If, however, the line has been changed, remote buffer control element 16 moves a line to the requesting cache (18) and makes it exclusive/changed (EX/CH) and then invalidates its own copy of the line.

Figure 4:
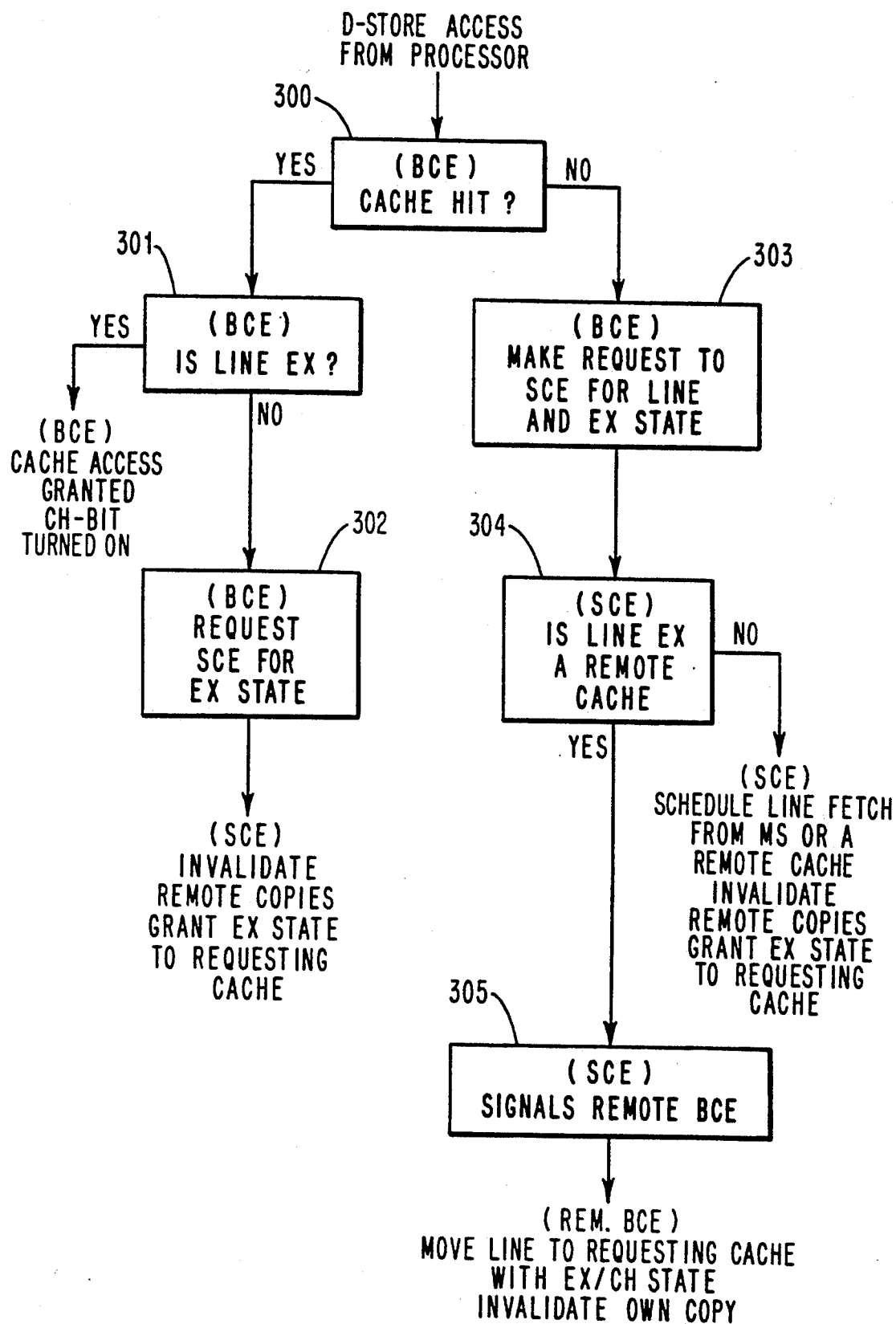

FIG. 4 shows a process for data store access. At Step 300 buffer control element 14 determines if the line being requested by the processor is contained in local cache 18. If it is, there is a cache hit. At Step 301 buffer control element 14 determines if the line is exclusive to the local cache (18). If it is, buffer control element 14 grants cache access and the CH bit is turned on. If it is not, however, buffer control element 14 requests storage control element 24 to make the line exclusive at Step 302. Then storage control element 24 invalidates remote copies and grants exclusive status to the line in requesting cache 18.

If however there is not a cache hit, at Step 303 buffer control element 14 makes a request to storage control element for the line and assigns exclusive status to the line. At Step 304 it is then determined by storage control element if the line is exclusive in remote cache, for example. cache 20. If it is not, storage control element 24 schedules the line for fetching from main storage or a remote cache and invalidates remote copies. It then further grants exclusive status to the line in the requesting cache. If, however, the line is exclusive in remote cache 20, storage control element 24 then at Step 305 signals remote buffer control element 16. Remote buffer control element 16 then moves a line to requesting cache 18 and assigns an exclusive/changed state and then invalidates it owns copy.

As will be clear upon reference to the foregoing description of a data fetch cache miss from processor i the requested line will be transferred as changed (CH) if it is found changed in remote processor j (12) although the particular D-Fetch only wants to read the line. If later on, processor j (12) wants to access the line before it is modified by processor i (10) another line transfer from cache i to cache j will be needed. This unnecessary overhead of line transfer and the associated cross interrogate (XI) activities, can be saved if upon the data fetch miss of processor i (10) the line is made read only (shared) in both caches at the expense of main storage castout (that is, storage of the line back into main storage 26). The conditional data fetch CH criteria has previously been found a reasonable choice, since modified data lines tend to be modified soon after they are data fetched. As a result, a data fetch with a CH state will most likely avoid the main storage castout traffic and subsequent EX state requests (when the line is stored with RO state).

Environmental changes, however, have caused the above described data fetch CH criteria to cause anomalous behavior. The CH line may be concurrently shared (with RO state) by multiple caches only when the line is instruction fetched (which is less likely) or when it ages out (replaced) from the cache and is referenced again through a miss later. As caches become larger and as more processors are added to a multiprocessor system, the chance for a CH line to age out without being accessed by any other processors decreases substantially. As a result, a line with CH status is more likely not shareable even when it no longer gets stored into for a long time and when the line is read from different processors repeatedly. This unnecessary loss of concurrency may be a significant performance bottleneck for certain applications.

This occurs because the CH bit is indicating both data contamination (i.e. main storage content 26 is not up to date) and the tendency of a line to be stored into. As a CH line gets passed around between different caches, the CH bit may not reflect the fact that the line is no longer being modified.

In the present invention, however, an additional state is assigned to a cache line in the cache directory, which is referred to herein as $CH_{loc}$, (local-change) that indicates whether or not a line has recently been modified by the processor. A line L is in the $CH_{loc}$ state for processor i if it was modified since the last time cache i received a copy of the line. When a cache gets a copy of line L it is not in the $CH_{loc}$ state, but $CH_{loc}$ state is entered when the processor stores into the line. The $CH_{loc}$ state is used as an indicator on the tendency for modification of a line, and may be used for various multiprocessor cache optimizations.

In the present invention, which may be considered a modification of the design discussed above and illustrated in FIGS. 1-4, an extra bit (LCH bit) per cache directory entry is used in the buffer control element. The manipulation of the LCH bit is described below.

When a line is fetched into a cache, the associated LCH bit is turned off. But when a line is stored into from the processor both the associated CH bit and LCH bit are turned on.

Multiprocessor operation is now modified mainly for the situation in which a data fetch cache miss involves a remotely held exclusive cache line. Thus when a data fetch from processor i (10) misses a line L that is found exclusive at remote processor j (12) by storage control element 24, storage control element 24 signals remote buffer control element j (16) of processor j (12) to release its exclusive status on line L. Upon receiving that signal, buffer control element j (16) of processor j (12) checks whether the line is in a state (i.e. whether the associated LCH bit is on). If so, the line is sent to processor i (via CTC bus 22) having both an exclusive (EX) and changed (CH) state. Otherwise processor i (10) will receive line L having a read only (RO) state. This involves castout to main storage 26 if L has CH status at cache j (20).

Figure 5:
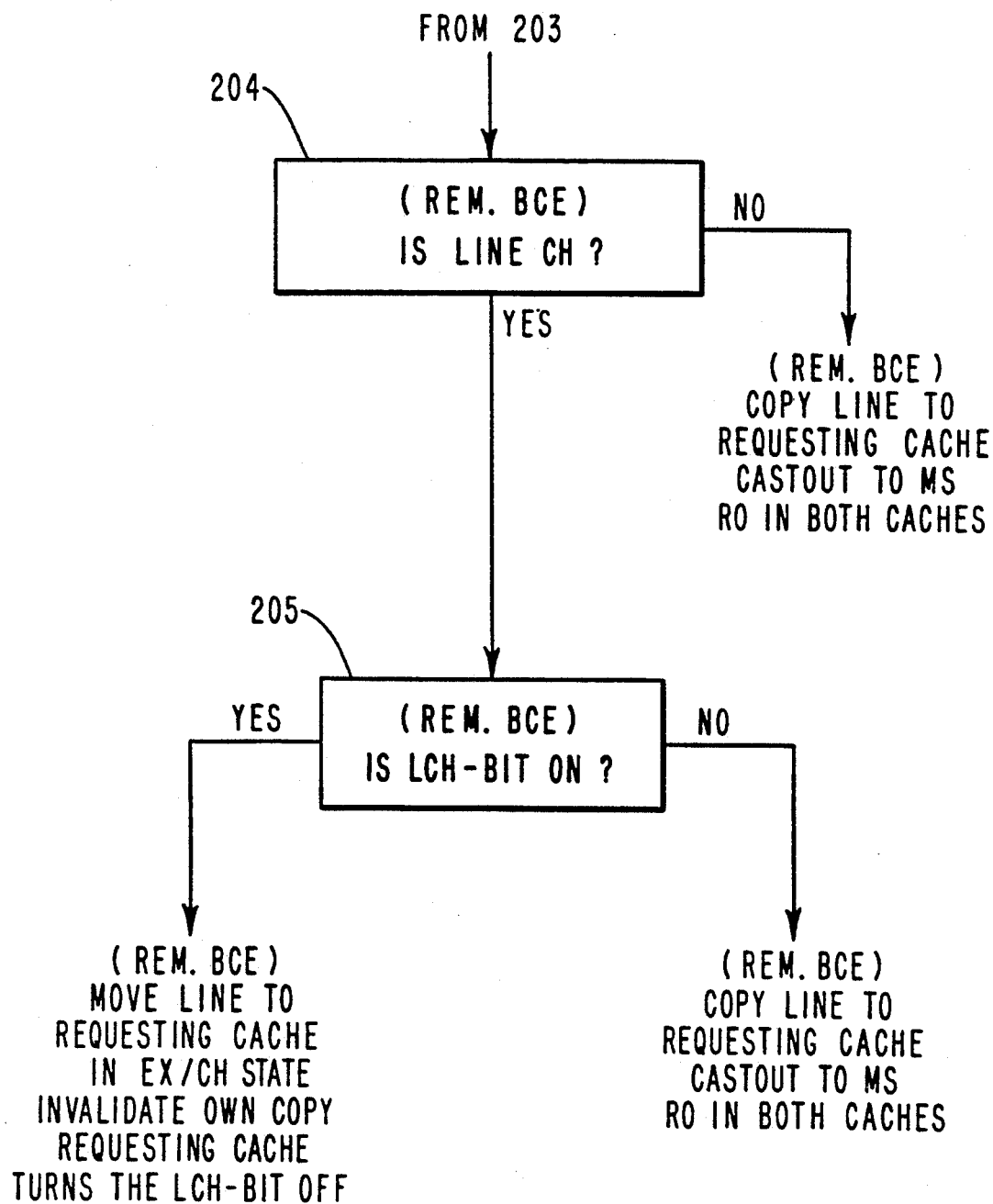
FIG. 5 is a flow-chart showing operation of the present invention.

FIG. 5 shows the logical steps of FIG. 3 for operations related to LCH bits. Hence, the flow-chart of FIG. 3 is modified such that a data fetch miss to a remote CH line results on EX fetch line the line is also in a $CH_{loc}$ state at the remote cache, and will result in RO sharing otherwise. This automatically increases concurrency for line sharing when a line no longer tends to be modified, at the expense of some additional memory castouts.

Referring to FIGS. 3 and 5. If in FIG. 3 at Step 202 storage control element 24 has determined that the line being accessed or requested is remotely exclusive after there has been a cache miss then after Steps 202 and 203 of FIG. 3 are performed, instead of going to Step 204 of FIG. 3, the modified operation now continues at Step 204 in FIG. 5. At this step remote buffer control element (16) now determines if the line has a status of CH. If it has not, remote buffer control element 16 copies the line to the requesting cache, does a castout to main storage and sets the line to read only status in both caches. If, however, remote buffer control element (16) determines that the line has been changed it next determines at Step 205 whether or not the LCH bit has been turned on. If the LCH bit has not been turned on the remote buffer control element copies the line to the requesting cache, makes a castout to main storage 26 and sets the line to read only in both caches. If, however, it determines that the LCH bit is on, it moves the lines of the requesting cache in a EX/CH state and invalidates its own copy. The requesting cache then turns the LCH bit off.

In the above design modification the CH state may be considered as being partitioned into two substates, i.e., $CH_{loc}$ and $CH_{rem}$, where $CH_{rem}$ means that the line is contaminated due to modifications carried from another cache, while $CH_{loc}$ means that the line is contaminated due to recent stores from the local processors.

The $CH_{loc}$ state is used mainly as an assist to multiprocessor cache management and is not critical to architecture correctness if it has been implemented properly. Therefore it is not necessary to provide ECC for the correction of transient errors on the LCH bits. In some implementations, it is neither necessary to have the LCH bits on critical path for cache accesses (e.g. stores). In some implementations it is also possible simply to approximate the $CH_{loc}$ states to reduce design complexity.

The local-change concept may be applied to various multiprocessor cache designs. For instance, it may be used in a store-thru multiprocessor cache design having exclusive states. It is not necessary to use CH bits as in store-in designs. The $CH_{loc}$ histories, however, may still be used to determine whether a data fetch cache miss should acquire an EX state.

I claim:

1. In a multiprocessor system having main storage and a plurality of caches of storing lines of information and a cache-to-cache transfer facility interconnecting said caches for directly transferring lines among said caches without castout to said main storage, each line stored in any of said caches having either a valid state or invalid state and also having either a read-only state or exclusive state, any particular one of said lines stored in any particular one of said caches and having said valid and exclusive states being readable and modifiable by said multiprocessor system, any particular one of said lines stored in any particular one of said caches and having said valid and read-only states being readable and not modifiable by said multiprocessor system, and any particular one of said lines stored in any particular one of said caches and having said invalid state being not readable and not modifiable by said multiprocessor system, improved apparatus for determining whether said read-only state or said exclusive state is assigned to a line of information fetched into one of said caches when said fetched line is already stored in another one of said caches in order to improve concurrency in said caches, comprising: means for maintaining local change state information for each line stored in any of said caches, said local change state information for a particular one of said lines stored in a particular one of said caches indicating whether or not said particular one of said lines stored in said particular one of said caches has been modified by said multiprocessor system while said particular one of said lines has been resident in said particular one of said caches;

means coupled to said maintaining means for assigning said read-only state to said fetched line in said one cache if said fetched line has said read-only state in said another cache or has said exclusive state in said another cache and has not been modified by said multiprocessor system based upon said local change state information for said fetched line while said fetched line has been in said another cache; and means coupled to said maintaining means for assigning said exclusive state to said fetched line in said one cache only if said fetched line has said exclusive state in said another cache and has been modified in said another cache by said multiprocessor system based upon said local change state information for said fetched line while said fetched line has been in said another cache.

2. Improved apparatus as defined in claim 1 wherein said means for maintaining local change state information includes a local change bit associated with each line stored in any of said caches, said local change bit associated with any particular one of said lines stored in any particular one of said caches maintaining said local change state information for said particular one of said lines stored in said particular one of said caches.

3. Improved apparatus as defined in claim 2 wherein said caches are store-thru caches and wherein said local change bit associated with any particular one of said lines stored in any particular one of said caches indicates whether or not said particular one of said lines stored in said particular one of said caches has been modified by said multiprocessor system while resident in said particular one of said caches.

4. Improved apparatus as defined in claim 2 wherein said caches are store-in caches, said local change bit associated with any particular one of said lines stored in any particular one of said caches indicating whether or not said particular one of said lines stored in said particular one of said caches has been modified by said multiprocessor system while resident in said particular one of said caches irrespective of whether or not said particular one of said lines stored in said particular one of said caches has been modified by said multiprocessor system without castout to said main storage before being fetched into said particular one of said caches.

5. Improved apparatus as defined in claim 4 and further comprising a global change bit associated with each line stored in any of said caches, said global change bit associated with any particular one of said lines stored in any particular one of said caches indicating whether or not said particular one of said lines stored in said particular one of said caches has been modified by said multiprocessor system without updating said main storage before being fetched into said particular one of said caches.

6. An improved method for maintaining coherence in a memory system of a type having a main memory and a plurality of caches for storing lines of information, a cache-to-cache transfer facility interconnecting said caches for directly transferring lines among said caches without castout to said main memory, and a separate processor associated with and served by each of said caches, each line stored in any of said caches having either a valid state or invalid state and also having either a read-only state or exclusive state, any particular one of said lines stored in any particular one of said caches and having said valid and exclusive states being readable and modifiable by said processor associated with said particular one of said caches, any particular one of said lines stored in said particular one of said caches and having said valid and read-only states being readable and not modifiable by said processor associated with said particular one of said caches, and any particular one of said lines stored in said particular one of said caches and having said invalid state being not readable and not modifiable by said processor associated with said particular one of said caches, said improved method comprising the steps of:

assigning a local change state to each line stored in any of said caches in said valid and exclusive states if, and only if, said line has been modified while stored in said any of said caches cache by said processor associated with said any of said caches cache;

when a needed line is requested by any one of said processors and said cache associated with said processor requesting said needed line does not contain said needed line in said valid state and said needed line is contained in another one of said caches other than said cache associated with said processor requesting said needed line and has said valid and exclusive states, fetching said needed line to said cache associated with said processor requesting said needed line;

assigning said exclusive state to said needed line in said cache associated with said processor requesting said needed line only if said needed line has said local change state in said another one of said caches; and assigning said read-only state to said needed line in said cache associated with said processor requesting said needed line if said needed line does not have said local change state in said another one of said caches.

7. An improved method as defined in claim 6 and further comprising the step of:

assigning said valid and said read-only states to said needed line in said another are of said caches if said needed line has been assigned said read-only state in said cache associated with said processor requesting said needed line; and assigning said invalid state to said needed line in said another one of said caches if said needed line has been assigned said exclusive state in said cache associated with said processor requesting said needed line.

8. An improved method as defined in claim 6 wherein said caches are store-in caches.

* * * * *